United States Patent [19]

Rodgers

[11] Patent Number: 5,799,438
[45] Date of Patent: Sep. 1, 1998

[54] DEVICE FOR STRINGING AND SUPPORTING PLANTS

[76] Inventor: Ernest Charles Rodgers, 525 Clearfield Rd., Fenelton, Pa. 16034

[21] Appl. No.: 629,075

[22] Filed: Apr. 5, 1996

[51] Int. Cl.$^6$ .......................... A01G 17/06; A01G 17/14
[52] U.S. Cl. .............................................. 47/46; 242/588
[58] Field of Search ............................ 47/46, 1.01, 44; 242/588, 588.1

[56] References Cited

U.S. PATENT DOCUMENTS

| 3,944,161 | 3/1976 | Kauf | 47/56 |
| 4,254,579 | 3/1981 | Flynn . | |
| 4,945,674 | 8/1990 | Alexandrian et al. | 47/1.01 |

FOREIGN PATENT DOCUMENTS

| 102711 | 9/1965 | Denmark | 47/46 |
| 172006 | 6/1906 | Germany | 47/46 |
| 406133647 | 5/1994 | Japan | 47/46 |

Primary Examiner—Michael J. Carone
Assistant Examiner—Joanne C. Downs
Attorney, Agent, or Firm—George C. Atwell

[57] ABSTRACT

A device for stringing and supporting growing plants, such as tomato plants, and which is manually operable by a workman includes a handheld, elongated pole having a handle end, an opposite dispensing end, a tip member having an aperture and which is secured to the dispensing end, and a plurality of brackets having eyelets positioned adjacent the handle end and projecting perpendicular from the pole. Further included is a container for attachment to the workman's belt and disposed within the container is a rotatable ball of string which is dispensed from the container during the stringing of the plants. As a length of the string is successively wrapped around spaced-apart stakes adjacent to and located on either side of several plants in a row of plants by the workman's manipulation of the pole's dispensing end, the string is dispensed out through the slot of the container, through the eyelets of the brackets along the pole, and through the tip member aperture whereby the string is wrapped around all the stakes in that particular row in both directions, thus encircling and supporting the plants between one or more levels of string.

5 Claims, 2 Drawing Sheets

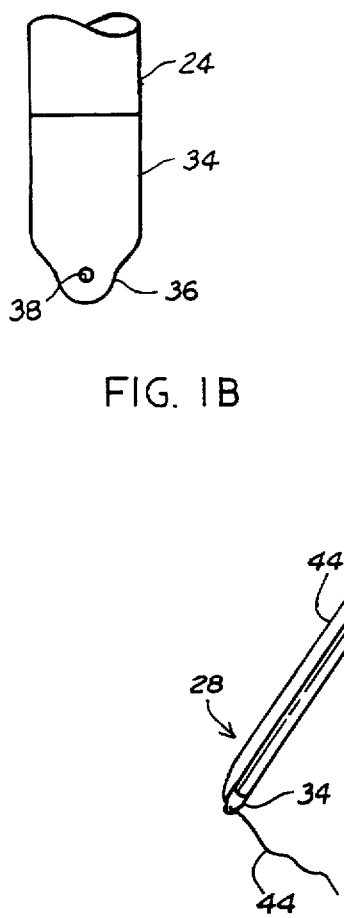
FIG. 1B
FIG. 1
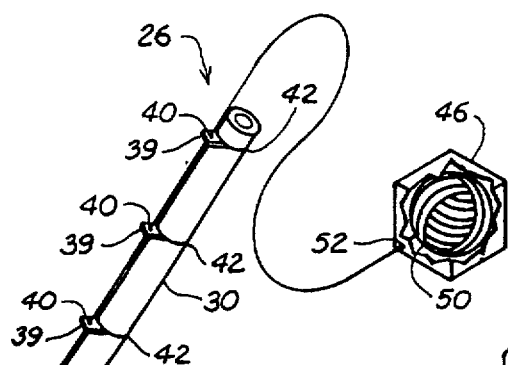
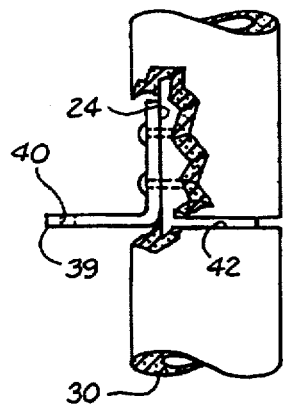
FIG. 1A
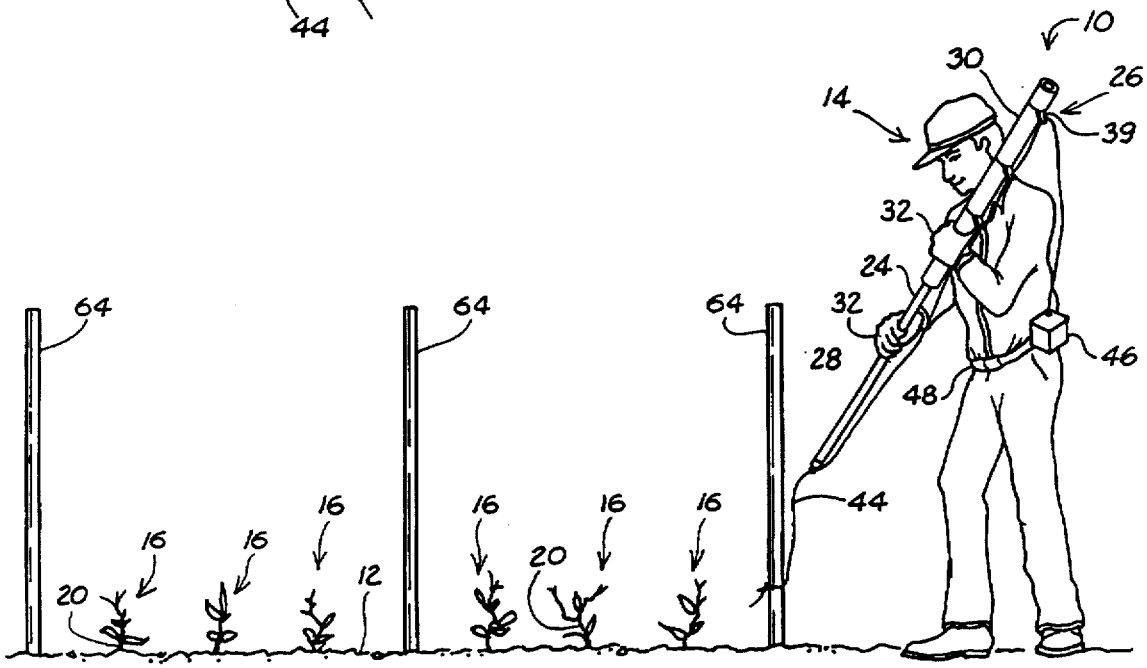
FIG. 2

DEVICE FOR STRINGING AND SUPPORTING PLANTS

BACKGROUND OF THE INVENTION

The present invention pertains to a device for use primarily in the agricultural industry and, more particularly, pertains to a device which is used to support and string plants producing edible fruits, berries, and vegetables.

Despite the enormous variety of food-producing crops cultivated by man, all require a number of common elements to properly grow and produce the particular seed, berry, vegetable, or fruit which will be picked, harvested, processed, and consumed. Among the common elements are adequate sunlight and rainfall, an uninterrupted growing season, soil containing plentiful nutrients, and an adequate plot or area of ground wherein the growth of weeds and other competing plants is continually suppressed or eradicated by weeding, the application of fertilizer, or by laying down ground coverings in the form of sheets or tarps.

In addition, a number of plants require assistance and support in maintaining the continuous upward growth of their stalks or stems. As the stalks or stems of the plants grow upward from the soil, their respective fruits or berries will grow upon the branches and add a downwardly-directed weight to the plant stalk or stem. The combined weight of the blossoming fruits or berries will bend the plant stalk down to the ground in its mid-growth. The plant stalk will continue to grow but, because the weight of the blossoming fruits or berries has pulled and bent the stalk to the ground, further growth of the plant stalk will be confined to snaking along the ground. With the growth of the plant stalk proximate to the ground, the sunlight necessary for continued healthy growth will be obscured by any leaves and branches located above the bent-over stalk.

Furthermore, with the stalk or stem of the plant pulled over and bent adjacent to the ground, both the plant and any fruit or berries growing thereon will be susceptible to decay and rot because of ground moisture and ground-dwelling insects. Indeed, after a heavy or protracted rainfall, the bent-over plant stalks and their growing fruit or berries may lay in puddles or even pools of water for hours or days until the puddles or pools eventually seep into the ground and are evaporated by the heat energy of sunlight. Several such instances of heavy or protracted rainfall may kill the plant and the fruit, vegetables, or berries growing thereon before they can be picked and retrieved and, thus, saved by the workman, field hand, or farmer. Enlarge such a plant loss to the hundreds, thousands, tens of thousands, or more, and it is very easy to comprehend how crop losses in the millions of dollars can result from a combination of heavy or protracted rainfall, insect predation, and inadequately supported plant stalks or stems.

Whether the plants or crops are grown in one's backyard on a small scale or on large-scale agricultural farms, a number of different techniques are used to support and maintain the upward growth of such plants and crops. For example, a latticework structure, such as a trellis, can be used to support the upward growth of climbing plants. Vineyards often employ a wire mesh structure in the shape of a walk-through tunnel to support the growth of the stems and branches thereon. In the case of plants having a single stem with numerous branches growing outward therefrom, a different technique of support is used.

One of the most common plants cultivated is the tomato plant. Whether a single row of tomato plants is being grown in a backyard garden or dozens of rows of tomato plants, each row being between 400 and 800 feet long, are grown on a large farm, the problem confronting the respective grower is the same: the stalks of the plants must be supported as they grow or the weight of the growing and ripening tomatoes will bend the stalks and pull the stalks downward toward the ground impairing the further growth of the plant and creating the conditions that will eventually lead to that particular plant's decay.

The time-honored method to support a growing tomato plant is to drive a stake (wooden or metal) into the ground adjacent the plant and, using string or cloth, tie that respective plant stalk to the stake. As the stalk grows, it can be tied to the stake at several points along the vertical extension of the stake. For a small backyard garden comprising a single row of tomato plants, this is a task which requires a modest amount of time and effort. However, for rows of tomato plants grown in a large agricultural setting, tying each individual plant to its own adjacent stake at several points or levels thereon throughout the full growth and maturation of each tomato plant is a time-consuming, labor-intensive process. Therefore, a more efficient means of supporting and stringing plants, with an emphasis on tomato plants, is needed.

SUMMARY OF THE INVENTION

The present invention comprehends a device for stringing and supporting plants and crops, with an emphasis on stringing and supporting tomato plants, and which is manually operable and manipulable by a workman while walking alongside each successive plant or crop row.

The device of the present invention includes an elongated pole having a handle end which is held by the workman and an opposite dispensing end which is positioned adjacent to the plants and stakes during the process of stringing and supporting the plants. A plurality of spaced-apart brackets are secured to the pole adjacent the handle end and project perpendicular therefrom. Each bracket further includes an eyelet through which the string passes, and the eyelets of all the brackets are in axial alignment with each other. Attached to the dispensing end is a tip member, and the tip member includes an aperture through which string can pass.

In the device of the present invention, the string that supports each row of plants is in the form of a rotatable ball, and the ball is free to tumble while being enclosed within a box or container secured to the back of a workman's belt. The container includes a slot through which the string passes as the string is dispensed during the process of stringing the plants.

It is an objective of the present invention to provide a device which permits a workman to easily, quickly, and efficiently string a row of plants by manipulating the device while walking along the respective row of plants.

It is another objective of the present invention to provide a device which obviates the need for the workman to manually tie each plant in the row to an adjacent stake.

The foregoing and other objects and advantages, when taken in conjunction with the following detailed description and accompanying drawings, illustrate the preferred embodiment of the invention.

BRIEF DESCRIPTION OF THE DRAWINGS

FIG. 1 is a perspective view of the device of the present invention;

FIG. 1A is a sectioned side elevational view of the device first shown in FIG. 1;

FIG. 1B is an enlarged fragmentary view of the tip member of the device first shown in FIG. 1;

FIG. 2 is a side elevational view of the device disposed in its operative disposition of being manipulated by a workman;

DETAILED DESCRIPTION OF THE PREFERRED EMBODIMENT

Illustrated in FIGS. 1–4 is a device 10 for stringing and supporting plants to assist the plants in growing upward from the soil or ground 12 to their full height without bowing or bending due to the weight of the fruit, berries, seed, or vegetables growing and maturing thereon during the growth of the plant. The device 10 is easily manually manipulable by an individual or workman 14, such as a field hand, farmer, or backyard gardener, and requires only brief instruction in the use thereof. The device 10 is useful when there is a row or number of rows of growing plants which require stringing and supporting; the primary use of the device 10 will be in large agricultural settings where dozens and perhaps even several hundred rows of growing plants are located, with each row being approximately 400 to 800 feet long.

Figure 4:
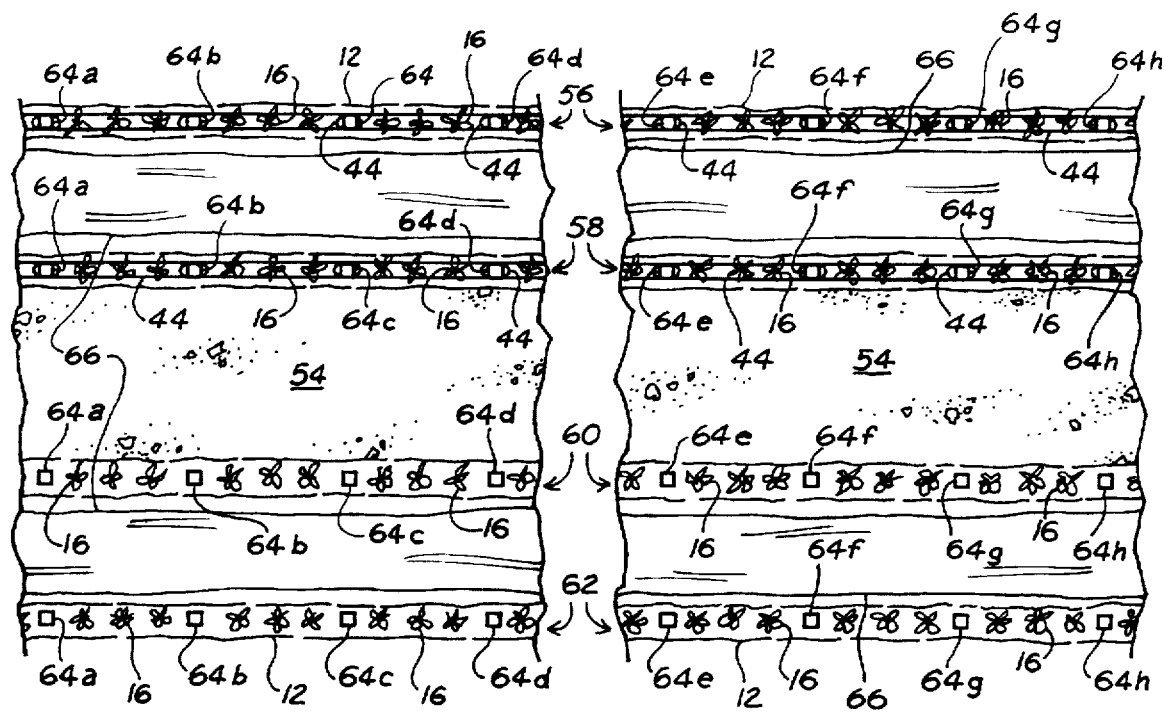
FIG. 4 is a top plan view of several rows of tomato plants illustrating the arrangement of stakes and tomato plants.
Figure 3:
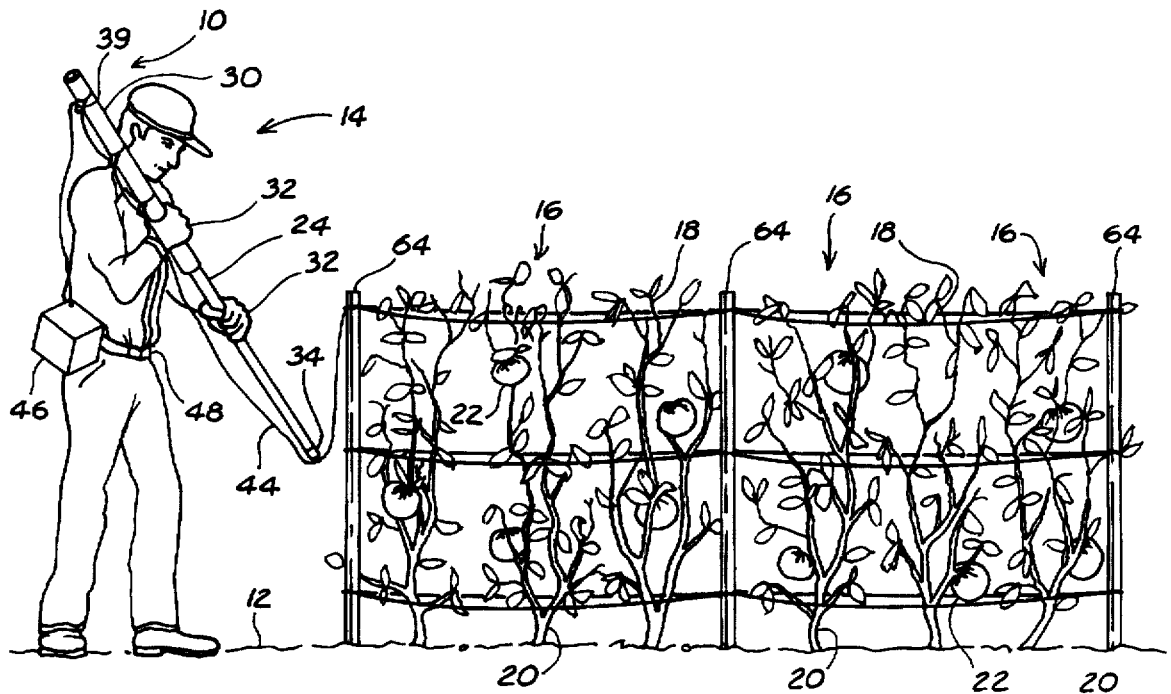
FIG. 3 is a side elevational view of the device disposed in its operative disposition of being manipulated by a workman in a row of growing tomato plants.

The primary growing plant for which the device 10 is used is a tomato plant 16. As shown in FIGS. 2–4, tomato plants 16 may attain a height of five feet, although they are normally from three to three-and-one-half feet tall, and include numerous branches 18 extending from a stem or stalk 20. Each branch 18 may bear a number of tomatoes 22, and, in many instances, the cumulative weight of the tomatoes 22 will bend the stalk 20 of the plant 16 downward to the ground 12. With the stalk 20 bent downward to the ground 12, its further normal growth is prevented and the stalk 20 is susceptible to decay and rot through the predation of ground dwelling insects, the inability to obtain adequate sunlight, and the exposure to excessive moisture from pools and paddles created by heavy or protracted rainfall which does not immediately permeate the ground 12 or evaporate into the atmosphere.

Therefore, the device 10 is utilized to facilitate the normal and continuous upward growth of the tomato plant 16—or any plant—by stringing and supporting the plant 16. As shown in FIGS. 1–3, the device 10 includes an elongated pole 24 having an upper or handle end 26 and an oppositely-disposed lower or dispensing end 28. Preferably, the pole 24 should be a wooden pole similar to, or adapted from, dowel stock; although the pole 24 may be a cylindrical metal pole. The pole 24 may be from three to five feet long and will include a padding member 30 coaxial to the handle end 26. The padding member 30 may be soft rubber, or other dense, resilient material, which is wrapped around and tightly secured to the handle end 26. The padding member 30 provides support and cushioning for hands 32 of the workman 14 when the device 10 is used in the field to string and support plants. Moreover, adding the padding member 30 allows the workman 14 to more easily grip the pole 24 by enlarging the circumference of the handle end 26. In addition, the padding member 30 provides a resistive surface for the hands 32 which is advantageous when stringing is performed in hot, humid weather. Attached to the dispensing end 28 is a removably securable ferrule or tip member 34 and, in the preferred embodiment of the device 10, the tip member 34 is screwed into the dispensing end 28. The tip member 34 is preferably a metal fitting which fits onto the dispensing end 28 and includes an arched portion 36 which defines a tip aperture 38.

As shown in FIGS. 1, 1A, and 1B, the device 10 also includes a string or cord guiding means secured to the handle end 26. In the present invention, the guiding means includes a plurality of spaced-apart brackets 39 secured to the handle end 26 by a plurality of fasteners and projecting perpendicular from the axis of the pole 24. The brackets 39 are further defined by having eyelets 40 through which string can pass. The eyelets 40 of the brackets 39 are in axial alignment with each other. The brackets 39 project through slots 42 formed where the separate pieces of the padding member 30 are disposed adjacent to one another so as to allow the brackets 39 to project upwardly past the padding member 30 perpendicular to the axis of the pole 24. Any number of brackets 39 may be used as the guiding means; however, in the present invention, only three spaced-apart brackets 39 are necessary.

As shown in FIGS. 1–3, the device 10 includes a means for dispensing a length of string or cord 44 to actually string and support the row of plants 16. The means for dispensing the cord 44 includes a box or container 46 removably securable to the back of a belt 48 worn by the workman 14. Enclosed within the container 46 is a rotatable ball 50 of wrapped cord 44, and the container 46 includes a slot 52 through which the cord 44 can pass as the ball 50 tumbles freely within the container 46 allowing the cord 44 to unwind from the ball 50 during the process of stringing and supporting the plants 16. The cord 44 can also be wrapped on a spool and thus unwound from the spool and dispensed by the device 10 during the stringing of the plants 16.

FIG. 4 is a top plan view of several rows of plants 16. In large agricultural settings where such tomato plants 16 are grown, the rows may be between 400 and 800 feet long, the distance between two adjacent rows of tomato plants will be approximately 16 inches, and the width of a dirt walkway 54 whereupon the individual 14 traverses during the process of stringing and supporting the plants 16 is approximately two to two-and-a-half feet wide. The left-hand side of FIG. 4 can be arbitrarily designated as the beginning of plant rows 56, 58, 60, and 62, with the end of rows 56–62 continuing to and then ending at the right-hand side of FIG. 4. Rows 56–62 are representative of several of the hundreds of rows which may exist on a large agricultural farm, all of which will be laid out in the same manner as rows 56–62. Collectively, all the stakes will be designated by reference number 64, and for the purpose of explaining the stringing of the plants 16, as shown in FIG. 4, the stakes will be further designated, from left to right, as stakes 64a, 64b, 64c, 64d, 64e, 64f, 64g, and 64h. The stakes 64 may be metal or wood and are generally four feet long with approximately six inches of each stake 64 fixed into the ground 12.

Starting from stake 64a in each row 56–62, two or three plants 16 will be planted in line and then stake 64b will be fixed into the ground 12. Following stake 64b, several more plants 16 are planted in line and so on down the row of plants 16, with stakes 64c–64h each separating several plants 16 down the entire length of each row 56–62. In order to inhibit the growth of weeds and other undesirable plants, a plastic covering or tarp 66 is laid down between adjacent rows of plants 16 and will extend the entire length of the rows 56–62. The plants 16 should be approximately eight inches to ten inches tall before the first level of cord 44 is wrapped around and secured to all the stakes 64a–64h in the respective rows 56–62. FIG. 4 illustrates rows 56 and 58 having cord 44 wrapped around and secured to the stakes 64a–64h for encircling and enclosing the plants 16 between the cord 44. Rows 60 and 62 do not yet have cord 44 wrapped about and secured to the stakes 64a–64h for stringing and supporting the respective plants 16 therebetween.

In order to string and support plants, such as plants 16 of FIGS. 2–4, the workman 14 first manually unwinds and dispenses a length of cord 44 from the ball 50 enclosed within the container 46 through the slot 52, and then the workman 14 threads the cord 44 through the eyelets 40 and through the tip aperture 38 so that a length of cord 44 extends beyond the tip aperture 38. The workman 14 may then attach the container 46 to the back of his belt 48 so that the cord 44 dispenses up along his back and over one of his shoulders. The workman 14 then ties the extending end of the cord 44 to stake 64a in row 56 at a location on stake 64a approximately six inches to eight inches above the ground 12. The workman 14 then firmly grasps the pole 24 adjacent the handle end 26 and walks sideways or backwards on the walkway 54 and adjacent row 56 until he arrives at stake 64b while simultaneously dispensing more cord 44 from the container 46. When the workman 14 arrives at stake 64b, he holds the pole 24 vertical and perpendicular to the ground 12 and quickly makes a circular motion with the dispensing end 28 about stake 64b so that a length of cord 44 is dispensed and tautly wrapped around stake 64b. As the workman 14 then walks to stake 64c, a length of cord 44 is dispensed and, upon arrival at stake 64c, he repeats the same circular motion with the dispensing end 28 about stake 64c so that the cord 44 is wrapped around stake 64c.

The workman 14 proceeds along row 56 in this manner, stopping at each of the stakes 64d–64g to quickly manipulate the dispensing end 28 in a circular motion to wrap and secure the cord 44 around each respective stake 64d–64g in row 56 until he arrives at stake 64h in row 56. When the workman 14 comes to stake 64h in row 56, he manipulates the dispensing end 28 so as to wrap the cord 44 around stake 64h and then the workman 14 simply retraces his steps back up that same row 56. As the workman 14 walks back up row 56, the cord 44 is continuously and simultaneously being dispensed from the ball 50 as the workman 14 manipulates the dispensing end 28 in a circular pattern around each successive stake 64h–64a in the reverse order. Thus, the plants 16 are encircled and supported between the entire length of cord 44 going down row 56, and also the entire length of cord 44 which is wrapped around the same stakes 64h–64a as the workman 14 walks back up row 56 until he reaches stake 64a at the start of row 56.

Since tomato plants are on average between three and five feet tall, and mostly between three and three-and-a-half feet tall, four different levels of cord 44 will need to be wrapped around and secured to each row 56–62 of stakes 64 and plants 16, with each level of cord 44 spaced approximately six to eight inches from the level of cord 44 located above and/or below. FIG. 3 illustrates the first three levels of cord 44 wrapped around the stakes 64 for enclosing the plants 16. When the workman 14 finally arrives back at stake 64a at which he started, he can wrap the cord 44 around stake 64a, dispense a short length of the cord 44 from the ball 50, and then cut off the cord 44 below the tip member 34 so that the cord 44 can be tied to stake 64a, thus completing the stringing and supporting of plants 16 for that respective row 56.

The workman 14 then walks to the next adjacent row 58 and repeats the same process by first dispensing a length of cord 44 and tying it to stake 64a in row 58, and then walking along row 58 continuously and simultaneously dispensing cord 44 and manipulating the dispensing end 28 of the pole 24 so that the cord 44 is wrapped around and secured to each respective stake 64b–64h in row 58. During this process, the workman 14 must make certain that the dispensed cord 44 is level along its entire length from stake 64a to stake 64h in row 58, and also generally level as the cord 44 is dispensed when the workman 14 retraces his steps back up row 58 and returns to stake 64a. If four levels of cord 44 are used to string and support the plants 16, this process will need to be repeated at least four times during the growing season of the plants 16.

The ease and quickness of stringing and supporting plants 16 by manipulating the pole 24 around stakes 64 in a continuous movement is in marked contrast to the prior method of stringing and supporting tomato plants which required a workman 14 to physically fix one stake 64 beside each plant 16 and then, as the plant 16 grew, the workman 14 was required to tie the plant 16 to that stake 64 by the use of cord 44 or a cut piece of cloth. The present invention dramatically reduces the time required by the workman 14 to string and support the plants 16 by allowing the workman 14 to use one continuous motion whereby cord 44 is continuously dispensed from the ball 50 and wrapped around each respective stake 64a–64h in that respective row 56–62 simultaneously with the workman 14 proceeding down that row 56–62 to the last stake 64h and then turning around and coming back up the row 56–62 to the very first stake 64a.

In addition, the device of the present invention can be used to define a boundary or perimeter of an area, such as a farm plot, residential home development, or construction site project. In order to define and mark out such a boundary or perimeter, a workman could simply place stakes into the ground along the boundary or area to be defined, and then, instead of physically tying string, cord, or rope to each stake, the workman could dispense a length of cord from the device, tie or loop the cord to an arbitrarily designated first stake, and walk along the perimeter to the next stake manipulating the dispensing end of the pole to wrap the cord around that stake, and then continue along the perimeter until the cord is wrapped around all the stakes so that the area is clearly defined. Thus, the device can be used in any environment where an area needs to be defined by the use of stakes and cord wrapped about and strung from stake to stake to mark and enclose the area.

In the drawings and specification there has been disclosed a typical preferred embodiment of the invention and, although specific terms are employed, they are used in a generic and descriptive sense only and not for purposes of limitation. The scope of the invention is set forth in the following claims.

I claim:

1. A device for stringing and supporting tomato plants by enclosing the tomato plants within the string as the string is wrapped around a row of spaced-apart stakes adjacent the plants, one stake at a time, and which is manually operable by a workman, the device comprising:

an elongated pole having a handle end and an opposite dispensing end;

a plurality of spaced-apart brackets secured to the pole adjacent the handle end and projecting perpendicular therefrom;

each bracket having an eyelet through which the string can pass and the eyelets of all the brackets in axial alignment with each other;

a tip member having an aperture and which is attached to the dispensing end of the pole; and means for dispensing the string along the pole and successively through the eyelets and the aperture of the tip member so that the string can be wrapped around and secured to the stakes to encircle and support the tomato plants therebetween.

2. The device of claim 1 further comprising a padding member secured to the handle end of the pole for providing a soft cushion and resilient grip for the workman's hands.

3. The device of claim 1 wherein the means for dispensing the string includes a container for securement to the belt of the workman and having a slot through which the string can pass.

4. The device of claim, 3 wherein the means for dispensing the string includes a spool disposed within the container and around which string is wrapped so that the string can be dispensed from the container for stringing the plants.

5. A device, manually operable by a workman, for stringing and supporting plants between successive wraps of a length of string, comprising:

an elongated pole having a handle end and an opposite dispensing end;

a plurality of spaced-apart brackets secured to the pole adjacent the handle end and which project perpendicular to the axis of the pole, each bracket having an eyelet through which the string can pass and the eyelets being in axial alignment with each other;

means for dispensing the string along the pole and through the eyelets in order to encircle and support plants between successive wraps of the string; and a tip member mounted to the dispensing end of the pole and through which string can pass for stringing the plants.

* * * * *